E. B. STONE.
SAFETY DEVICE FOR POWER OPERATED MACHINES.
APPLICATION FILED DEC. 9, 1913.

1,111,276.  Patented Sept. 22, 1914.

WITNESSES:
Marie E. Meyer.

INVENTOR.
Elmer B. Stone.
BY
Arthur B. Jenkins,
ATTORNEY.

UNITED STATES PATENT OFFICE.

ELMER B. STONE, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

SAFETY DEVICE FOR POWER-OPERATED MACHINES.

1,111,276.  Specification of Letters Patent.  Patented Sept. 22, 1914.

Application filed December 9, 1913. Serial No. 805,527.

*To all whom it may concern:*

Be it known that I, ELMER B. STONE, a citizen of the United States, and a resident of New Britain, in the county of Hartford and State of Connecticut, have invented a new and Improved Safety Device for Power-Operated Machines, of which the following is a specification.

My invention relates to the class of devices for preventing accident or injury to the person of an operative in running such machine, my invention being especially applicable in preventing injury during "repeating" of the machine.

One form of device embodying my invention and in the construction and use of which the objects herein set out, as well as others, may be attained, is illustrated in the accompanying drawings, in which—

Figure 2:
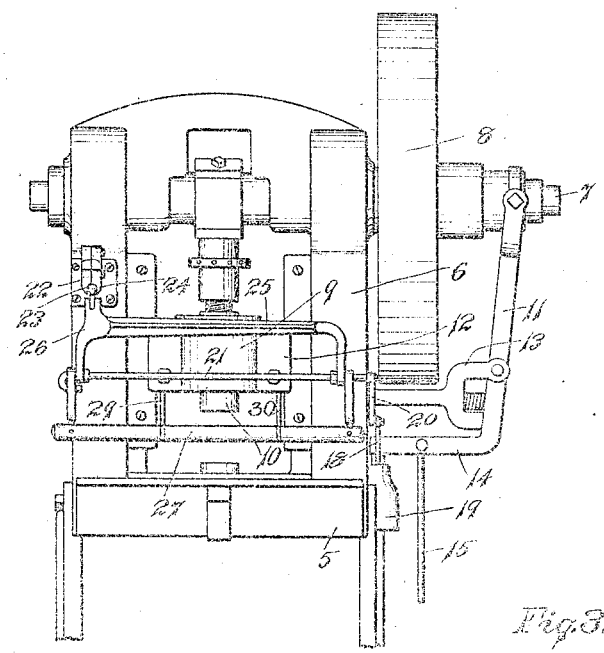
Figure 1:
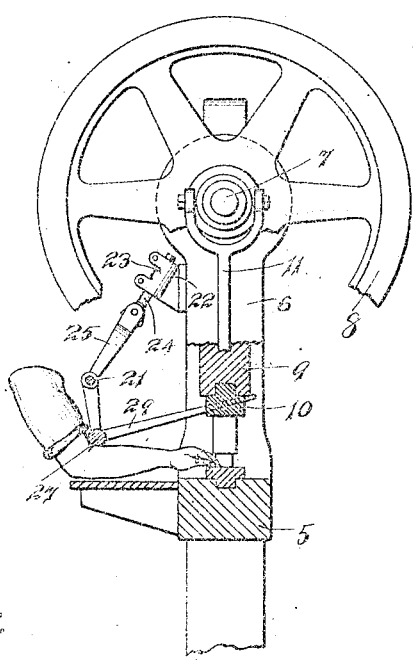
Figure 3:
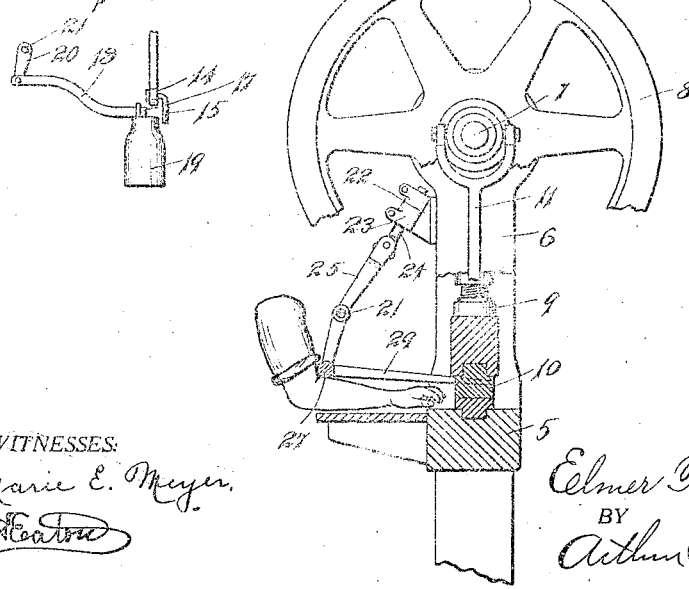

Figure 1 is a side view of the upper portion of a machine embodying my invention, with parts broken away to show construction. Fig. 2 is a front view of the same. Fig. 3 is a detail view illustrating the operation of the device when the machine "repeats." Fig. 4 is a detail view showing the construction and operation of the locking device.

My improved safety appliance is calculated to permit the operations of feeding a machine, as a drop press, by the methods heretofore employed and without, in any manner, impeding the work of the operative, the device being constructed to effect its purpose only when the machine "repeats," that is, when, without the intention of the operator, it performs a second operation, as by reason of non-release of the clutch parts.

My improved device is especially applicable in connection with the safety appliance forming the subject matter of my copending application filed April 30th, 1913, Serial Number 764,592, and to which application reference is hereby made for information as to construction and operation of parts not embodying the invention as may not be clearly illustrated and described herein.

In the accompanying drawings the numeral 5 indicates the base of a machine, that may be supported in any suitable manner and upon which a frame 6 is located, this frame supporting a driving shaft 7 having a driving pulley 8 mounted thereon and adapted to operate a plunger 9 supporting a die 10 of a drop press, all of which parts may be of ordinary and well known construction and which include a clutch member operated by a clutch or starting lever 11 to connect the pulley 8 with the shaft 7 to rotate the latter in a manner common to machines of this class, and it will be understood that although a drop press is employed for the purpose of illustration and description of the invention, the latter is not necessarily limited to a machine of this kind. The machine also embodies guide plates 12 for holding the reciprocating member or plunger in position. The clutch lever 11 is pivotally mounted in a bracket 13 secured to the side of the frame and has a foot 14 connected by a rod 15 with a pedal (not shown) mounted in convenient position for access by the foot of the operator.

A dog 17 is located for movement into the path of the foot 14 of the lever 11 whenever the hands of the operative are in the danger zone and liable to injury by movement of the plunger 9, in the form of mechanism herein shown this dog constituting the end of a sliding bar 18 mounted, as to its end, on a dog support 19 secured to the side of the machine frame. The other end of this bar is pivotally attached to a dog operating arm 20 secured to a dog operating shaft 21 mounted in a supporting frame removably attached to the machine frame in any suitable manner, as by means of a bracket 22 having a socket 23 to receive a frame support 24. One end bar 26 of said supporting frame is attached to the support 24, and the cross bar 25 is rigidly attached to said end bar, the end of the cross bar being bent to form another end bar oppositely disposed to the bar 26. The dog operating shaft 21 is mounted in these end bars, and a dog operating bar 27 is suspended from and secured to said shaft in any suitable manner to impart rocking movement thereto.

The bar 27 is preferably constructed of bamboo or other light material and is adapted to rest against and be located immediately in front of or over the arms of the operator so that it will readily respond to the movements of the operator's arms in all directions and be no substantial obstruction to such movement, and the dog 17 will be moved into the path of movement of the foot 14 of the lever 11 and prevent operation of the machine whenever the operator's hands are in dangerous positions.

It sometimes happens, in the operation of the machines of this class, that when the clutch is operated to connect the pulley 8 with the shaft 7 to operate the plunger, for one reason or another the clutch parts may fail to disengage under the influence of the spring commonly employed for this purpose, with a result that the machine will continue to operate or "repeat" its operation. This result, however, is liable to be unnoticed by the operative until after the hands have been placed in the danger zone to feed the machine, and it is to prevent accident, and yet permit full unrestricted use of the hands at all other times, that the present invention has been devised by me. In accomplishing this end I provide a feeler or feelers 29, 30 secured to and projecting from the dog operating bar 27, the ends of these feelers opposite the bar being so located that when the bar is at that limit of its play toward the plunger the feelers will be located under some movable part of the plunger. As herein shown two feelers are provided located at opposite sides of the lengthwise center of the dog operating bar, and in such position that they will pass underneath the plunger on opposite sides of the die 10, the feelers in fact being located underneath the edges of the plunger or slide located between the guides composed of the guide plates 12. From this construction it will be noted that should the machine "repeat" and should the hands of the operative at this time be placed in a dangerous position, the moving plunger coming in contact with the ends of the feelers will push the bar 27 away from the machine, and the arms of the operator being always in contact with the bar when in this position, the hands will be pushed backwardly out of the danger zone. It will be noted that this construction provides a device that will operate only in case of a "repeat" and with the hands of the operative in the danger zone, and at the same time the movements of the person of operative are unrestricted and the feeding of the machine may proceed in substantially the same manner as if the safety device were not employed.

The term person is employed in the specification and claims herein with its full and regular meaning denoting the body or any member thereof as the arms, legs, hands, feet or the like.

While I have shown and described herein a preferred form of construction of my improved apparatus for accomplishing my purpose this may be departed from to a greater or lesser degree and yet be within the spirit and intent of the invention, and I do not therefore limit my invention to the exact construction of mechanism as illustrated and described herein.

I claim—

1. In combination with the reciprocating member of a machine, a device located in the path of movement of the person of the operative and necessarily moved thereby in the regular operation of feeding the machine, a lock to prevent operation of the machine, said lock being connected to be operated by said device, and a feeler connected to said device to be moved into the path of movement of said reciprocating member.

2. In combination with the reciprocating member of a machine, a lock to prevent operation of the machine, a safety device connected with the lock to operate it, said safety device being located in front of the arms of the operative in the regular movement of feeding the machine, and a feeler connected with the safety device to be projected into the path of movement of said reciprocating member in the movement of said safety device.

3. In combination with the reciprocating member of a machine, a clutch operating lever, a lock to prevent movement of the clutch operating lever, a safety device connected with the lock to operate it, said safety device being located in front of and in the path of movement of the arms of the operative in the regular movements in feeding the machine, and a feeler connected with said safety device to be projected in the path of movement of said reciprocating member at each reciprocating movement of the safety device.

4. In combination with the reciprocating member of a machine, a lock to prevent operation of the machine, a safety bar suspended in front of said reciprocating member, a connection between said safety bar and lock to operate the latter, said safety bar being located in front of and in the path of movement of the arms of the operative in the regular movements of feeding the machine, and a feeler connected with said safety bar to be moved thereby into the path of movement of said reciprocating member.

5. In combination with the reciprocating member of a machine, a safety bar suspended for swinging movement in front of said reciprocating member and in front of and actuated by the arms of the operative in the regular movements of feeding the machine, a lock to prevent operation of the machine, a connection between said bar and lock to operate the latter, and a feeler rigidly secured to said safety bar and with its end projecting into the path of movement of said reciprocating member when the bar is at that limit of its movement nearest the reciprocating member.

ELMER B. STONE.

Witnesses.
W. L. HOWE,
RUTH M. BURKA...